United States Patent [19]

Meinerding

[11] Patent Number: 5,167,109
[45] Date of Patent: Dec. 1, 1992

[54] ROTARY MOWER BLADE

[76] Inventor: Wesley C. Meinerding, 4863 F Fulton Rd., NW., Canton, Ohio 44718

[21] Appl. No.: 812,829

[22] Filed: Dec. 24, 1991

[51] Int. Cl.⁵ .................. A01D 34/73; A01D 55/00
[52] U.S. Cl. ............................ 56/295; 56/DIG. 17; 56/DIG. 20
[58] Field of Search ............. 56/295, 255, DIG. 17, 56/DIG. 20

[56] References Cited

U.S. PATENT DOCUMENTS 2,786,318  3/1957  Caldwell et al. ............. 56/295 X
3,320,733  5/1967  Kirk ................................ 56/295
3,485,022  12/1969 Freedlander et al. ........... 56/295
3,717,985  2/1973  Freedlander et al. ........... 56/295
3,762,138  10/1973 Michael ........................... 56/295
4,320,617  3/1982  Fedeli .............................. 56/295
4,715,173  12/1987 Anderson ........................ 56/295

Primary Examiner—Stephen J. Novosad
Attorney, Agent, or Firm—Chenpatents

[57] ABSTRACT

A rotary lawn mower blade has a plurality of shredders with cutting edges affixed to the blade. The shredders provide additional cutting edges for fine shredding of vegetation.

18 Claims, 3 Drawing Sheets

ROTARY MOWER BLADE

BACKGROUND OF THE INVENTION

1. Field of Invention

This invention relates to an improved rotary mower blade having a plurality of small cutters, hereinafter referred to as shredders, affixed thereto for shredding vegetation such as grass, leaves or brush to fine pieces. More particularly, this invention relates to a solid rotary mower blade having affixed thereunder, thereabove or a combination thereof, a plurality of cutter blades, arranged along the length of the rotary blade, to provide additional cutting edges which accomplish fine shredding of vegetation.

Power rotary lawn mowers, ordinarily used for cutting grass, have been recognized as a convenient means of collecting leaves and thin twigs. According to the U.S. Environmental Protection Agency (EPA), from 18% to 20% of landfill volume is used for the disposal of grass and leaves. It costs municipalities as much as $200 per ton to dispose of grass and leaves. The EPA further states that landfill disposal of grass and leaves will be prohibited in December 1993.

Fine shredding and composting of the finely-shredded vegetation in private gardens and on municipal compost piles is therefore desirable, yielding valuable humus for soil enrichment.

2. Prior Art

Many improvements have been made on rotary lawn mower blades to facilitate mowing or shredding, such as filaments and plastic discs with serrated peripheries. Some of the improved blades are disclosed in the following patents:

U.S. Pat. No. 4,706,446 discloses a rotary lawn mower having double cutting units, the upper one rotary and the lower one stationary. The two units are concentrically mounted and provided with cutting blades in the adjacent planes of the units such that the blades of the upper rotating unit act as shears against the lower stationary blades.

U.S. Pat. No. 2,917,826 discloses a disc of a lawn trimmer having pocket-like attachments with sharp edges, for edging grass along a side walk or flower bed while the disc is held with its edge perpendicular to the soil.

U.S. Pat. No. 5,056,605 relates to a multipurpose disc cutter having sharp saw teeth around its periphery, pointing upward and downward.

U.S. Pat. No. 4,270,271 discloses a trimmer having two discs concentrically held apart from each other so as to accommodate pivotally mounted and removable blades therebetween.

U.S. Pat. No. 4,295,274 relates to a floor scraper having a disc and a plurality of leaf spring strips having the shape of a Z, each mounted on the disc circumference at one end, the other end of the Z strip being equipped with a flat metal cutter having a front cutting edge facing in the direction of rotation of the disc, the rear side of the cutter being at a slight angle with respect to the plane of the disc.

U.S. Pat. No. 4,577,382 and 3,176,455 disclose rotary disc blades or bar blades with saw teeth with different orientations and additional apertures on the disc having one lateral edge as cutting edge so as to increase the cutting rate.

U.S. Pat. No. 5,063,731 relates to brush and tree cutter blades having three spring loaded teeth or slicing blades mounted on the periphery of the hinged blades such that if the teeth hit a hard surface, the teeth will retract within their cages and the blades will deflect upward or downward to avoid damage to the blades and saw teeth.

It is evident that the prior art has not addressed the problem of shredding vegetation into fine pieces during the mowing of lawns so as to speed the decomposition of the cuttings in contact with soil or in a compost pile.

SUMMARY OF THE INVENTION

The rotary mower blade of this invention allows grass clippings, leaves and twigs to be finely shredded, to be greatly reduced in bulk volume, and to decompose rapidly on the ground or in a compost pile. It is the object of this invention to provide a simple and economical rotary blade with at least one row of longitudinally spaced shredders attached on the underside, upper side, or a combination of both, of the rotary blade so as to provide a multitude of additional cutting edges. A further object is to provide shredders both above and below the rotary brush blade to accomplish fine shredding of vegetation.

The advantages and feature of the improved rotary blade will be apparent from reading of the detailed description of the preferred embodiments in conjunction with the drawings.

DETAILED DESCRIPTION OF PREFERRED EMBODIMENTS OF THE INVENTION

Figure 1:
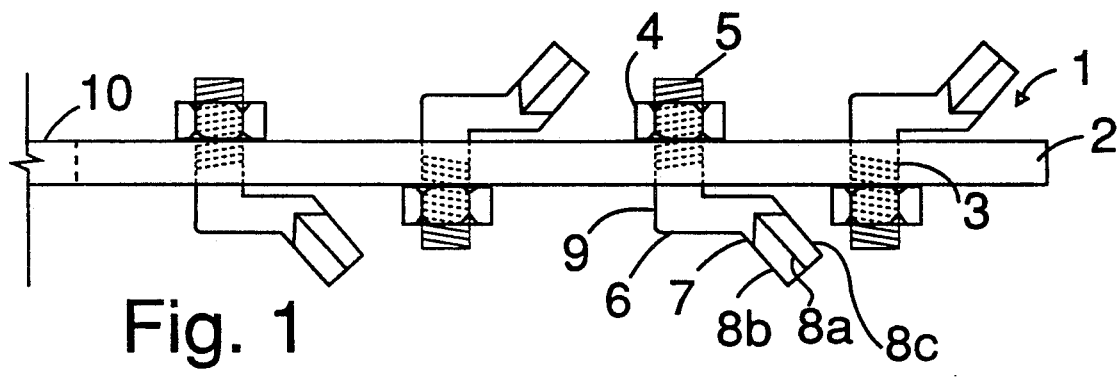
FIG. 1 is a side elevation of a rotary blade with a row of shredders with cutting edges.

Referring to FIG. 1, a rotary lawn mower blade generally denoted by 1, has a central bore 10, for attachment to a motor shaft. Only half of the blade is shown, the other half being a mirror image of the portion of the blade shown in this drawing. Blade 1 may be made of steel or hard plastic, such as polycarbonate, and may have a variety of shapes including that of a disc or a bar with a leading edge and trail up-lift wing. On blade 1, there is provided a row of apertures, 3, radiating from the central bore to the periphery of the blade. Into each of these apertures 3, an upper arm 5 of a shredder 9 is inserted. The upper arm 5, which is threaded at its upper extremity is secured by a lock nut 4. The diameter of arm 5 is slightly smaller than that of the aperture 3. The shredder 9 is thus free to rotate with respect to the rotary blade, 2. In an alternative embodiment, the arm 5 is rigidly fastened to the rotary blade, 2.

The shredders, 9 are repleceble and are generally fastened to the underside of the blade 1. Each shredder is made of a metal bar, such as carbon steel, ⅛" to ¼" in diameter bent twice at approximately right angles to the horizontal arm, 6 so as to have an upper vertical arm 5, a horizontal arm 6 connected thereto, and a lower vertical arm 7 connected to the horizontal arm 6. The arms 5, 6, and 7 form an integral part. The angle between arms 5 and 6 is preferably about 90 degrees; however a slight deviation from a right angle is acceptable. The angle formed by the arm 7 and the interconnecting arm 6 is preferably from 90 to 135 degrees. The length of the lower arm 7 should be about ½ to 1". The lower arm 7 has at least one cutting edge along its vertical axis.

The lower arm 7 is preferably provided with several longitudinal cutting edges such as three sharpened cutting edges 8a, 8b and 8c as shown, by grinding the lower arm such that it has the cross section of an equilateral triangle.

Since the shredder is able to rotate freely with respect to the rotary blade, the lower arm does not sustain damage when it hits a stone. Therefore, the mower may be adjusted such that the lower extremities of the shredders are relatively close to the ground to provide maximum shredding action. The shredders are preferably made of carbon steel; alternatively, they may be moulded from a hard plastic such as polycarbonate.

The arrangement of the shredders on the rotary blade is preferably in a row radiating outward from the center of the rotary blade, as shown in FIG. 1 (only two shredders are shown for clarity).

Figure 2:
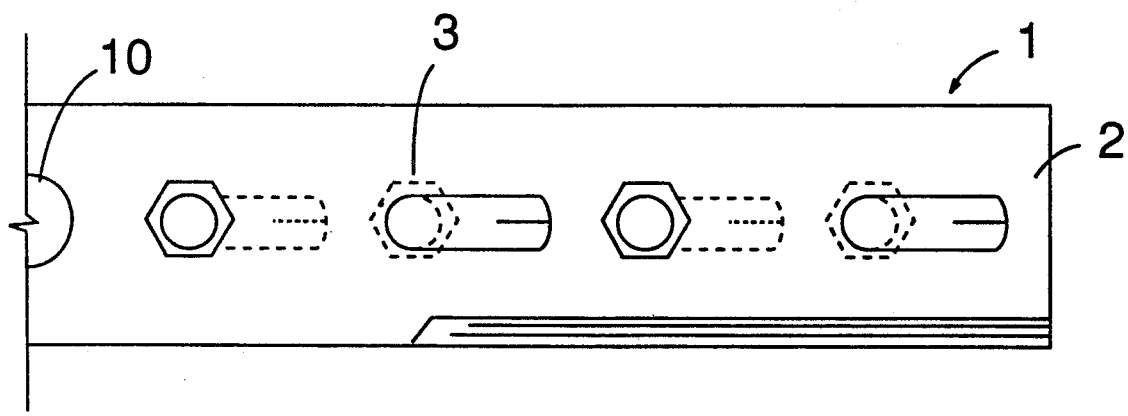
FIG. 2 is a plan view of the arrangement of shredders on a rotary blade.

Alternatively, as shown in FIG. 2, the shredders may be placed in two or more rows radiating from the center of the blade, or parallel to each other, at equal distances from each other and staggered from row to row.

Figure 3A:
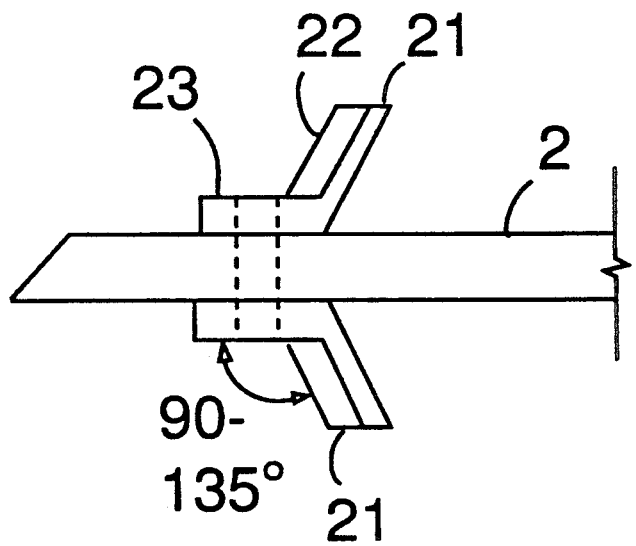
FIGS. 3a, 3b, and 3c illustrate another embodiment of the shredders.

In another embodiment, the shredder is made generally in the shape of a U as illustrated in FIGS. 3a, b, and c. Two arms 21 have longitudinal cutting edges, 22 and the interconnecting member 23 has an opening 24 through which the shredder is secured to the rotary blade by means of a bolt and lock nut (not shown). The arms 21 extend away from the interconnecting member 23 at an angle of 90 to 135 degrees as best seen in FIG. 3a which is side view of the two shredders being fastened above and below the blade.

Figure 3B:
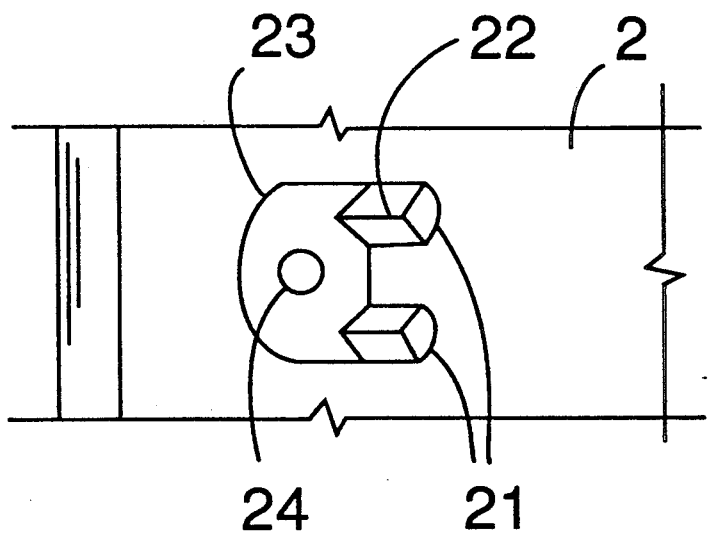
Figure 3C:
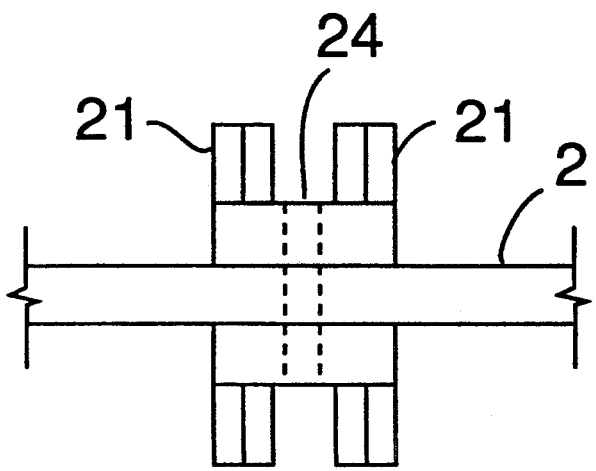

FIG. 3b is a plan view of this shredder which shows the two arms 21 having longitudinal cutting edges extending from the plane of connecting member 23 and blade 2. The extending shredder arms may be ground to have several longitudinal cutting edges as explained above. The shredder is attached to the rotary mower blade such that at least one of its cutting edges 22 points into the direction of motion as the mower blade rotates.

The shredders as described may be mounted only above or only below the rotary blade.

In all the above embodiments of the invention, the shredders may be restrained from rotating with respect to the rotary blade by means of square apertures on the blade and shredders and bolts having square shanks, such as carriage bolts, and lock nuts.

Figure 4A:
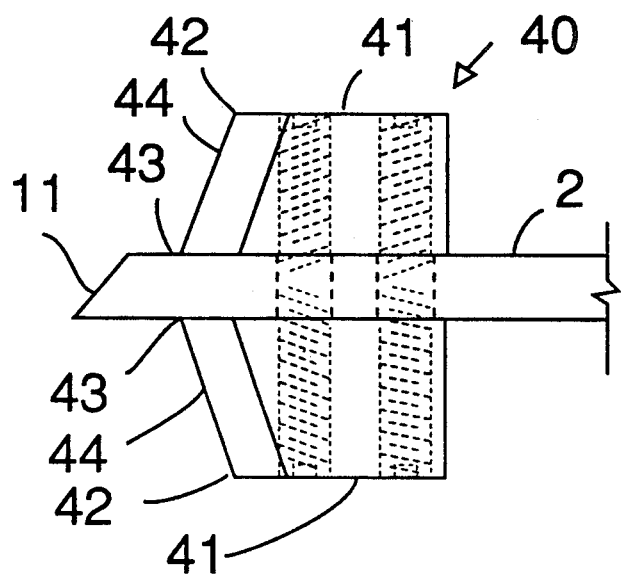
FIGS. 4a and 4b illustrate a shredder for a brush cutter blade including the shredders of this invention.
Figure 4B:
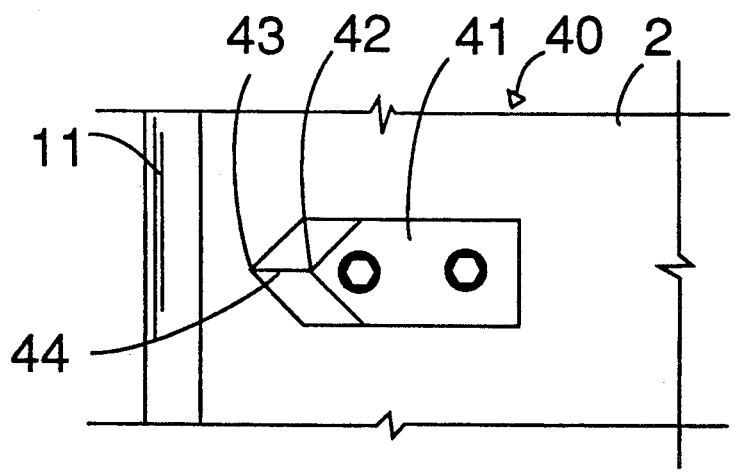

The shredder of this invention furthermore is useful as a brush cutter. Brush cutters generally have pivotally mounted blades to avoid damage by rocks, and the blade length varies from 15" to 24" depending on the size of cutter. FIG. 4b is a plan view of the shredder of this invention for brush cutters. The shredder 40 is a five-sided trapezoidal solid steel block about ¼" to ½" thick. The size of the shredder is about 1"-2" long and ½" wide. The top surface 41 has a point 42 which is recessed with respect to its corresponding lower point 43 of the bottom surface (not shown). From point 42 to point 43 is an inclined cutting edge 44. The shredders are spaced along the cutting edge or leading edge 11, of the blade and on the upper side of the brush cutter blade 2, with the cutting edge 44 perpendicular to the cutting edge 11. The shredders may also be fixed on the underside of the cutter blade. Alternatively, shredders are fastened to the rotary blade in pairs, one shredder above the blade aligned with one below the blade, their mounting holes lining up and the blades being held in place by common bolts or pins having matching holes corresponding to those of the shredders. A roll pin or a split pin may be used. The number of shredders may be as high as six pairs on each half of the rotary blade. The number of cutting edges may thus be increased twelvefold.

With the use of the improved rotary mower blade of this invention, it has been found that a layer of leaves three feet deep is reduced to dust, fines and shredded cuttings ¾" in size with one mowing. Without the shredders of this invention, an ordinary rotary blade would produce cuttings 3 to 4" long. The shredding is accomplished by the additional cutting edges while the clippings are being lifted to the discharge opening of the mower.

While only a limited number of embodiments has been described and shown herein, these are to be considered exemplary only, and numerous modifications may be made within the scope of the present invention which is to be limited only by the scope of the following claims.

What is claimed is:

1. An improved rotary lawn mower blade adaptable to a power lawn mower comprising:
   (a) a plurality of shredders each having an upper vertical arm, a lower downward arm, and a horizontal interconnecting arm, the lower arm having at least one longitudinal cutting edge;
   (b) a plurality of apertures disposed on and radiating from the center of the blade for receiving said upper arm; and
   (c) means for securing the upper arm to the blade whereby the cutting edge shreds the cuttings as the blade rotates.

2. The improved blade of claim 1 wherein the shredder is made of material selected from the group consisting of carbon steel and synthetic resins.

3. The improved blade of claim 1 wherein the upper arm of the shredder has a threaded portion and the securing means is a lock nut.

4. The improved blade of claim 1 wherein the lower arm forms an angle from 90 to 135 degrees with the connecting horizontal arm.

5. The improved blade of claim 1 wherein the upper arm is at a right angle with respect to the interconnecting arm.

6. The improved blade of claim 1 wherein the cutting edges of the lower arm are formed by grinding two intersecting planes therein.

7. The improved blade of claim 1 wherein said apertures form at least one row radiating from the center to the periphery of the blade.

8. The improved blade of claim 1 wherein said apertures form longitudinally at least one row from the center to the periphery of the blade and said blade is a bar.

9. The improved blade of claim 1 wherein said lower arms are below the blade.

10. The improved blade of claim 1 wherein said lower arms are above the blade.

11. The improved blade of claim 1 wherein said lower arm is freely rotatable.

12. The improved blade of claim 1 wherein said lower arm is restrained from rotation.

13. An improved rotary lawn mower blade adaptable to a power lawn mower comprising:

(a) a plurality of generally U-shaped shredders, each having two arms joined by an interconnecting member, said arms having longitudinal cutting edges and said arms forming an angle greater than 90 degrees with said interconnecting member;

(b) a plurality of apertures in the rotary blade;

(c) an opening on each said interconnecting member; and (d) means for securing shredders to said blade through said openings of the interconnecting members and through the apertures of the blade.

14. The improved blade of claim 13 wherein the apertures are at least one row.

15. The improved blade of claim 13 wherein the shredders are secured under and above the blade.

16. The improved blade of claim 13 wherein the shredders are restrained from rotation with respect to the blade.

17. An improved brush cutter blade mounted on a power shaft comprising:

(a) a plurality of wedge-shaped shredders each having a triangular front and a rectangular back; said triangular front and rectangular back having apertures; and each shredder having a cutting edge along the triangular front;

(b) a plurality of apertures on the cutter blade in the vicinity of the cutting edge; and (c) means for fastening said shredders to the blade through said apertures with the cutting edges of the shredders at right angles with the cutting edge of the brush cutter.

18. The improved blade of claim 17 wherein the shredders are arranged in pairs above and below the blade.

* * * * *